Oct. 25, 1932. M. DIECKMANN 1,885,023
SYSTEM FOR LOCATING MOVING BODIES
Filed Feb. 25, 1931
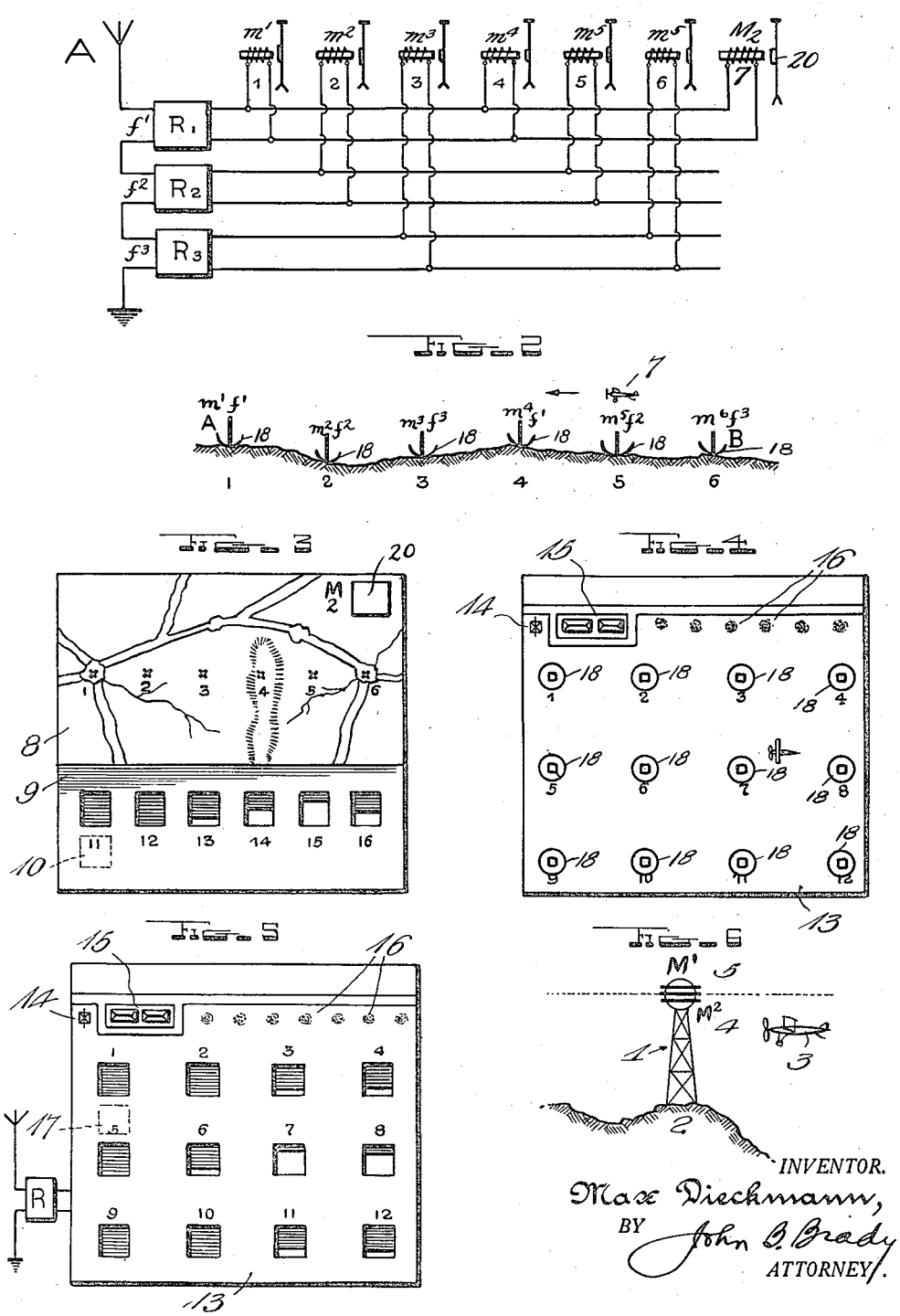
INVENTOR.
Max Dieckmann,
BY John B. Brady
ATTORNEY.

Patented Oct. 25, 1932

1,885,023

UNITED STATES PATENT OFFICE

MAX DIECKMANN, OF GRAEFELFING, NEAR MUNICH, GERMANY, ASSIGNOR OF ONE-THIRD TO OTTO SCHELLER, OF BERLIN, GERMANY, AND ONE-THIRD TO WILLIAM H. MURPHY, OF OCEANPORT, NEW JERSEY

SYSTEM FOR LOCATING MOVING BODIES

Application filed February 25, 1931, Serial No. 518,203, and in Germany March 29, 1927.

An application for this invention was filed in Germany, March 29, 1927.

My invention relates to means for visually indicating the location of bodies or mechanisms with respect to given points on the ground. More particularly my invention relates to means and apparatus for locating moving bodies, such, for instance, as aircraft with respect to points such, for instance, as those located along an air route or over the surface of an air port.

In the present embodiment of my invention the essential features consist of one or more receivers, such, for instance, as radio receivers connected to resonance indicators, such for instance, as electrically operated vibrating reeds, mounted directly under or on definite points on a map carried on an aircraft and indicating the characteristics of the area over which the aircraft travels.

My invention further embodies the use of a multiplicity of low power directional beacons, such, for example, as radio transmitters, having one or more carrier frequencies and each having a definite modulation frequency. These beacons are all of approximately the same power and are equally spaced, corresponding in their topographical location and modulation frequency to the map location and natural frequency of their respective resonators so that the resonance of any resonator on the map will indicate the approximate position of the aircraft with respect to points on the ground at that instant.

My invention will be more fully understood by reference to the accompanying drawing in which:

Figure 1 diagrammatically shows a multiplicity of independent radio receivers connected to an aperiodic antenna the receivers having electrically operated reeds connected therewith and so mounted that their vibration or stationary condition can be readily observed; Fig. 2 represents the location of an aircraft with respect to the profile of an air route embodying the principles of my invention; Fig. 3 illustrates a map of the same air route and the appearance of the visual reed indicator at the time that the aircraft is in the vicinity of point 4 on the map; Fig. 4 shows an air port with twelve sharply vertically directional transmitters such, for instance, as, ultra high frequency transmitters equipped with suitable reflectors; Fig. 5 shows a receiver as installed in an aircraft to which is connected twelve electrically operated reeds located under the surface of a chart of the air port shown in Fig. 4; Fig. 6 shows a marker beacon employing, for example, infra red light and equipped with suitable shields so that the modulated light in the upper zone is not perceived below the horizontal plane, and similarly so that the differently modulated light in the lower zone is not perceived in the upper zone. The purpose of such a beacon in addition to its use as a marker beacon is to indicate to a vehicle, such, for instance as, an aircraft that it is located above or below a dangerous altitude.

In Fig. 1 an aperiodic antenna A is connected to three radio receivers $R_1$, $R_2$, and $R_3$, which are tuned to three definite carrier frequencies $f_1$, $f_2$, and $f_3$ respectively. Connected to receiver $R_1$ are two reeds 1 and 4, to $R_2$ are connected reeds 2 and 5, and to $R_3$ are connected reeds 3 and 6. The natural frequencies of these reeds 1 to 6 are respectively $m_1$ to $m_6$. It is not to be understood that all of the carrier frequencies and modulation frequencies need be different but only that all modulation frequencies on any one carrier must differ from one another. One carrier and six modulation frequencies would suffice in this case and would under certain conditions be preferable as only one receiver would be required and this receiver would also be available for the reception of course indicating beacon signals such, for instance, as are obtained from interlocking equisignal beacons. Should now the vehicle be so located that the chief amount of energy received has a carrier frequency $f_2$ modulated at a frequency $m_5$ then the pick up would be through receiver $R_2$ and reed 5 would vibrate most strongly. Fig. 2 indicates the profile of an air route between two air ports 1 and 6. Along this route there are six beacon transmitters 1 to 6 all approximately equally spaced and radiating equal amounts of energy. Each of these transmitters is only sufficiently strong to reach for example to the second removed beacon in its effect on the reed which it controls. Now beacons 1 and 4 transmit in this example with a carrier frequency $f_1$, beacons 2 and 5 transmit with a carrier frequency $f_2$ and beacons 3 and 6 transmit with a carrier frequency $f_3$; the modulating frequencies employed at beacons 1 to 6 being $m_1$ to $m_6$ respectively. If the aircraft 7 is now moving from beacon 6 to beacon 5 being guided either by compass or for instance, by equisignal beacons at one or both ends of the route, then as it leaves beacon 6 and approaches beacon 5 the vibration of reed 6 will become weaker and the vibration of reed 5 will become stronger. At a point midway between beacons 6 and 5 the energy received will be equally strong from each beacon and reeds 6 and 5 will vibrate with equal intensity. Finally when the aircraft is in the direct vicinity of beacon 5 reed 5 will vibrate most strongly while reeds 6 and 4 will both vibrate weakly and with equal intensity. Fig. 3 shows a map 7 of the routes, which map is carried on the aircraft. On this map are shown the locations of the six beacons 1 to 6 and below each of these indicated beacons is located the corresponding reed which is actuated as indicated in Fig. 1. The lower half of the reed board 9 is shown covered in order that stationary reeds as indicated by 10 will not be visible, however this is not essential. The aircraft is assumed to be in the direct vicinity of beacon 5 as indicated in Fig. 2 and consequently reeds 14 and 16 are indicated as vibrating weakly and with equal intensity while reed 15 is indicated as vibrating strongly. It is understood that the beacons are not limited to radio transmitters but that, for instance, infra red beacons as shown in Fig. 6, properly modulated and spaced, may be employed and that suitable receivers be used for their detection. A special reed 20 is provided on chart 8 responsive to frequency $M_2$ as will be more fully described in connection with Fig. 6. Fig. 4 indicates a landing field on whose surface for example twelve vertically directional transmitters are evenly spaced. These transmitters may, for example, be short wave transmitters fitted with suitable reflectors indicated at 18 in Figs. 1 and 4, and all excited from a central source of frequency but each being differently modulated directly at each individual antenna with frequencies $m_1$ to $m_{12}$ respectively. Fig. 5 indicates the essential apparatus as mounted in an aircraft, where R is a suitable receiver and where 13 is a map of the landing field in which reeds are inserted to correspond in location and modulation frequency with the transmitters located on the ground. These reeds in turn are connected in the output of the receiver R in a manner similar to that indicated in Fig. 1. If now an aircraft arrives at the flying field over point 8 in Fig. 4 then reed 8 in Fig. 5 will vibrate strongly while adjacent reeds such as 4, 7, and 12, will only vibrate weakly or not at all, depending on the closeness of spacing and degree of directivity of the various transmitters. If the aircraft proceeds on toward point 7 then reed 7 will oscillate more and more strongly while reed 8 will vibrate less strongly. When the aircraft is directly between points 7 and 8 reeds 7 and 8 will oscillate with equal intensity as shown in Fig. 5. The vibration of the reeds therefore indicates to the pilot of the aircraft his exact position so that he is in a position to avoid obstacles such as 14 an antenna tower, 15 several buildings, or 16 a row of trees, etc. Stationary reeds may be covered as indicated by 17. It is not to be understood that the ground transmitters are limited to radio transmitters as other transmitters such as suitably modulated infra red lights may be employed as shown in Fig. 6 which illustrates a beacon of the infra red type, in which case the aircraft must be equipped with a suitable receiver for their reception and detection. The upper part of the transmitter in Fig. 6 radiates rays modulated at a frequency $M_1$. Proper shields insure that this light will only be received in the zone 5 or above a definite horizontal plane. Similarly the rays from the under part of the beacon are modulated at a frequency $M_2$ and suitable shields insure that rays can only be received in zone 4 or below a given horizontal plane. If now such a beacon 1 is located on a mountain crest 2 then an aircraft 3 flying in zone 4 will be warned by the vibration of a special reed of natural period $M_2$, that it is flying at a dangerous altitude. This frequency $M_2$ may be used in connection with all beacons mentioned above for the specific purpose of furnishing a warning that the aircraft is below a definite safe altitude. The chart apparatus shown in Fig. 3 is provided with a special reed 20 for responding to the frequency $M_1$ or $M_2$. My invention is not confined to the particular apparatus or the particular kinds of radiant energy indicated but may employ any form of radiant energy which may be modulated and suitable receivers and detectors. It is also not confined to definite resonance indicators but may employ any suitable indicators for the purpose of indicating definite points on a chart or map or of indicating heights over the ground.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In navigational systems, a plurality of signal transmitters located in predetermined arrangement over a geographical area, each adapted to selectively emit a particular modulation, a receiving apparatus carried by a mobile body for receiving the signals thus transmitted, and an apparatus connected with said receiving apparatus including vibratory reed devices arranged with respect to a geographical chart designating the transmitting stations in similitude over the geographical area in which the transmitting stations are located, said reed devices selectively responding to the modulation frequencies of the transmitting stations for indicating the movement of the mobile body over the geographical area defined by the transmitting stations.

2. In a navigational system, a plurality of signal transmission stations disposed in a predetermined arrangement over a geographical area, said stations being adapted to emit signals of different frequencies, signal receiving apparatus carried by a mobile body navigable over the aforesaid geographical area, an indicator apparatus carried by the mobile body simulating the geographical characteristics of the area over which the mobile body operates, and vibratory reed members located with respect to the indicator apparatus in positions simulating the positions of the transmitting stations each having frequency characteristics independently responsive under control of the frequencies of the transmitting stations and adapted to be selectively initiated in movement as the mobile body carrying said apparatus moves over the geographical area in which said transmitting stations are located for visually indicating the position of the mobile body with respect to the geographical area over which the mobile body operates.

In testimony whereof I affix my signature.

MAX DIECKMANN.